United States Patent [19]
Umbdenstock et al.

[11] 3,736,113
[45] May 29, 1973

[54] SPIRAL GRINDING RELIEVING MACHINE WITH TANDEM PLANETARY DIFFERENTIAL DRIVE

[75] Inventors: Walter Umbdenstock, Chicago; Charles T. Breitenstein, Elk Grove Village, both of Ill.

[73] Assignee: Spiral Step Stool Company, Elk Grove Village, Ill.

[22] Filed: Feb. 18, 1972

[21] Appl. No.: 227,377

Related U.S. Application Data

[63] Continuation of Ser. No. 24,509, April 1, 1970, abandoned.

[52] U.S. Cl. ................51/225, 51/95 LH, 51/232
[51] Int. Cl. .............................................B24b 3/24
[58] Field of Search........................51/95, 225, 232

[56] References Cited
UNITED STATES PATENTS

| | | | |
|---|---|---|---|
| 2,452,702 | 11/1948 | Umbdenstock | 51/94 IC |
| 2,330,921 | 10/1943 | Rickenman | 51/95 LH X |
| 2,792,676 | 5/1957 | Umbdenstock | 51/95 LH |
| 2,585,986 | 2/1952 | Ambreasson | 51/95 LH |

FOREIGN PATENTS OR APPLICATIONS

| | | | |
|---|---|---|---|
| 363,036 | 7/1921 | Germany | 51/95 LH |

*Primary Examiner*—Harold D. Whitehead
*Attorney*—Callard Livingston

[57] ABSTRACT

Spiral and radial relief grinding and backing off apparatus with improved headstock assembly capable of complex motion including simultaneous axial and radial displacements of a work spindle which is continuously rotated independently by a tandem planetary differential sine drive system operative to increase or reduce its speed as a selectable function of the linear travel of a machine carriage, traverse table, or the like, of which the headstock assembly and drive components are a structural part.

12 Claims, 10 Drawing Figures

INVENTORS.
Walter Umbdenstock &
Charles T. Breitenstein

INVENTORS.
Walter Umblenstock &
Charles T. Breitenstein

ATTY.

INVENTORS.
Walter Umbdenstock &
Charles T. Breitenstein
Attorney.

SPIRAL GRINDING RELIEVING MACHINE WITH TANDEM PLANETARY DIFFERENTIAL DRIVE

This is a continuation of application Ser. No. 24,509, filed on Apr. 1, 1970 and now abandoned.

This invention relates to machine tools and fixtures for spiral grinding, radial relief and related operations on multi-fluted drills, form-relieved cutters, reamers, and the like. Such operations require precision placement and intermittent controlled contacting of the work piece, for example a multi-spiral twist drill, with the grinding wheel progressively along the lip of the spiral flute and radially inwardly thereof, it being essential that the contact with the wheel be only momentary in order that the curvature of the wheel shall not grind an arc into the metal, in consequence of which the drill must be moved repetitiously back and forth laterally of its axis to and from engagement with the wheel with concurrent slight turning of the piece, in this instance the twist drill, in such degree that the helix of the spiral flute will be followed precisely and the repetitious contacts with the wheel will occur in each successive pass at precisely the proper locations along the lip and bordering land until the several flutes have been traversed.

In presenting the flutes to the grinding wheel the work piece is not only being turned about its own axis but is concurrently being reciprocated along that axis to generate the two motion components needed to effect a resultant spiral displacement while at the same time the work piece is being moved laterally against and back from the grinding wheel as the carriage advances.

In order to account for changes in angular location of the lip of the drill flute relative to the edge of the grinding wheel due to the spiral motion and the time required for the aforesaid sidewise bodily movements, an acceleration factor is introduced into the turning rate of the drill body concomitantly with the other motion components and at a calculated ratio to the travel of the machine carriage.

Such an acceleration factor can be derived by differential overdriving means, such for example as that shown in U.S. Pat. No. 2,792,676, wherein a ball-screw overdrive is included in series or tandem with the motor drive shaft which turns the work spindle continually at substantially constant normal speed. A thrust derived from carriage travel is applied axially to the drive shaft which produces an additive torque in the helical ball-screw coupling the spindle gears, thus increasing the speed of the work spindle. Such equipment is versatile and effective for precision work, but requires excessively long helical ball-screw shafting in order to develop very fast spiral leads.

Another type of helical overdrive is found in U.S. Pat. No. 2,452,702 wherein a first helical gear fast on the spindle drive shaft meshes with a parallel idling companion gear alongside and capable of shifting axially in such manner that when the companion gear is shifted by an axial thrust derived from carriage motion, the first or shaft gear is overdriven and the speed of the work spindle thereby increased.

In addition to providing improvements simplifying the construction, driving and operation of the headstock assembly in both machine and fixture applications, a further important object of the present disclosures is the use of a simple planetary gear accelerating means mounted in tandem with the main motor drive shaft for continuously rotating the work spindle at normal speed and applying an additive torque thereto responsive to a thrust derived from a carriage sine bar drive and transmitted by translating gears transported with the carriage, such an arrangement being capable of an unlimited accelerating drive ratio from very slow to very fast spiral leads without necessity of changing gear sets, helical screws, shafts, cams or other components as required in prior machines and fixtures of comparable utility and flexibility for precision spiral grinding and radial and form-relief operations.

Planetary spur gears have been employed previously in conjunction with such operations as grinding and cutting helical gears for the purpose of accurately indexing the helical grooves thereof relative to a grinding wheel, or correcting angular errors caused by play in gears operating to index the spindle with each change in direction of a carriage, as typified by the systems such as disclosed in U.S. Pat. No. 2,330,921 to Rieckenmann, or the German Pat. No. 363,036 (1921) to Zimmermann, the latter disclosing an example of a planetary type differential gear drive forming part of a live-center work spindle. Turning of an indexing shaft positions the helical groove of the helical gear for the wheel to follow, but with each reversal of the carriage, play in the planetary gears can cause the abrasive to cut beyond the sides of the groove. A special linkage with an adjustable oblong slot means between the differential unit and a stationary guide direction causes the gear-play errors to cancel out with each reversal of the carriage.

In the Rieckenmann patent a similar planetary gear unit is interposed in a complex gear train also operative to turn a live-center work spindle travelled by a piston-reciprocated carriage which has a codirectionally aligned gear rack movable therewith and driving the complex gear system. A bell crank moved by a correcting member on the side of the machine as the carriage moves, imparts an additional thrust to the rack and thus into the gear system, the stated purpose of the arrangement being to compensate for possible lack of gears of proper size in changing the complex gear system according to the helix angle of each particular job.

It is to be observed that, unlike the differential drive means presently disclosed, the planetary gearing employed in the prior Zimmermann and Rieckenmann patents is utilized only for correction of angular error arising from play in the gears or the presence of wrong-size gears in systems wherein the work spindle does not rotate continually and there is no radial or lateral displacement and no axial reciprocation of the spindle in situ as distinguished from bodily longitudinal travel with the carriage, so that such applications of planetary gearing in indexing, gear-play and gear-error correcting are not to be confused with the drive accelerating functions and structural arrangements of the present differential drive means in the machine and fixture embodiments of the apparatus as described in view of the annexed drawings in which:

FIG. 6-A is an enlarged fragmentary detail of the cam-coupling end of one of the headstock drive rods;

GENERALIZED STATEMENT OF OPERATION

Figure 9:
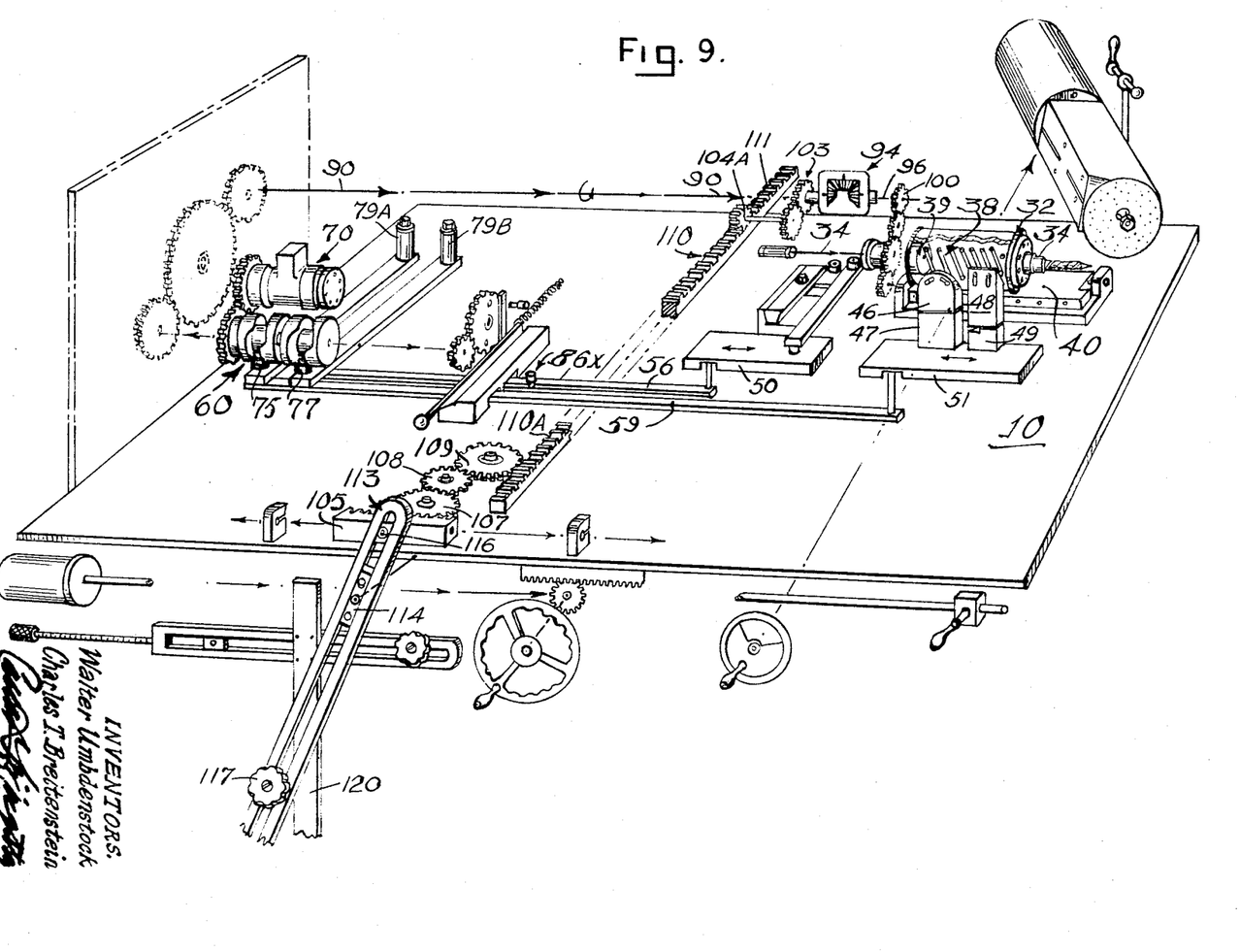
FIG. 9 is a pictorial operating schematic of the apparatus.

In FIG. 9, the work spindle 34 is part of a headstock structure bedded upon a travelling machine carriage 10 and a shiftable table means 40 thereon, such that in addition to being rotatable by the motor power shaft 90, the work spindle is travelled (longitudinally) with the carriage, and in addition can be reciprocated both longitudinally (axially) and laterally (radially) of its axis of rotation, all of these complex simultaneous motions and displacements of the workpiece being of adjustable magnitude relative to the grinding wheel disposed at the side of the carriage.

An adjustable-speed motor 70 travels with the carriage and headstock along with its power drive shaft 90, and also drives a cam means 60 to produce the displacements of the table means (as through drive rods 56, 59 and slide plates such as 50, 51) and therefore of the work spindle while the latter is being rotated from the power shaft 90 through a modulating drive means including a differential planetary gear means 94 which, if not modulated or supplementally driven, permits the work spindle to rotate at the selected and otherwise constant speed of the motor shaft 90.

Differential means 94 can be inert or it can add to or subtract from the speed of the motor shaft through the application to the differential input gear 103 of either a positive or negative over-driving torque derived from the carriage travel through differential rack means 110 shifted by a translating gear means carried with the system and including sine-drive input gear means 109 exposed to be juxtaposed with and activated by some form of adjustable-ratio sine drive means 105, 113. Such a planetary differential gear system for modulating the work spindle speed permits a very wide range of spiral or helical lead angles with a very compact differential planetary type gear unit operating in tandem with the motor power shaft and output spindle which is to drive the headstock or work spindle, either as a permanent part of the carriage assembly or as a fixture.

The necessity for and result of modifying the normal shaft speed of the planetary differential drive system is related to the helical displacement of multiple flutes on a drill or the like to be ground as each flute is turned repetitiously into position for engagement with the grinding wheel, as will be explained hereafter.

Figure 1:
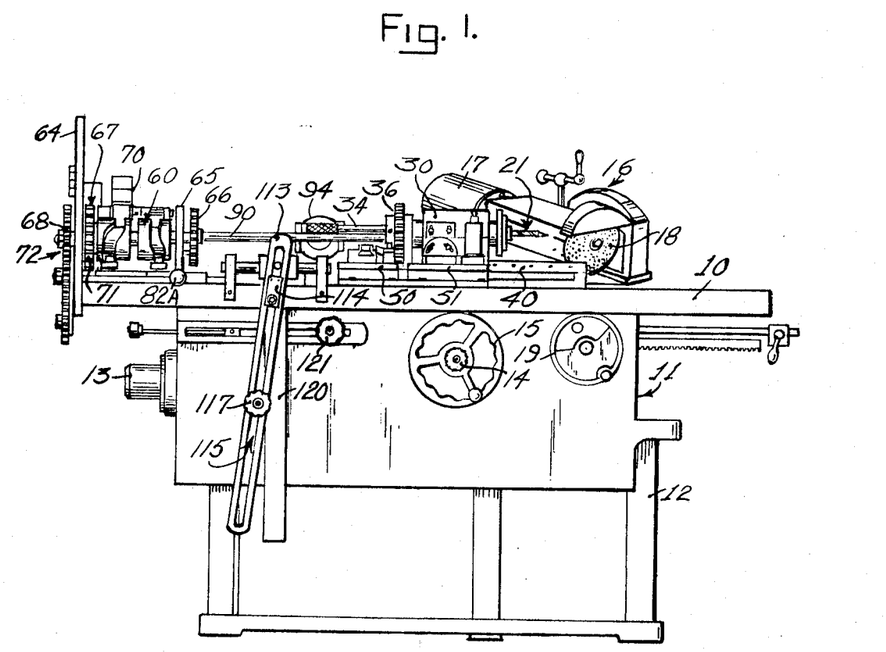
FIG. 1 is a front elevational view of the grinding apparatus in machine form.

The novel headstock assembly, drive, and control means is illustrated in FIG. 1 embodied in a type of grinding machine comprising a carriage 10 travelling back and forth on a bed 11 constituting part of a base structure 12 and driven by means of an adjustable constant speed hydraulic motor 13 in known manner under control of an operator's clamp or drive nut 14 at the hub of a hand wheel 15 which is itself operable to advance or return the carriage manually.

Disposed at the rearward side of the machine is a wide table area upon which is bedded any suitable form of grinding head, generally indicated at 16, and including a motor unit 17 and arbor for rotating various types of grinding wheel 18, the entire head in this assembly being shiftable laterally of the carriage travel by use of a cross-feed hand wheel 19, the unit, including the usual adjustments for setting the elevation and working angle of the grinding wheel 18 or other shaping implement relative to the work piece, which in this example is shown as a step drill 21 seized in the chuck 20 of the headstock 30.

Figure 2:
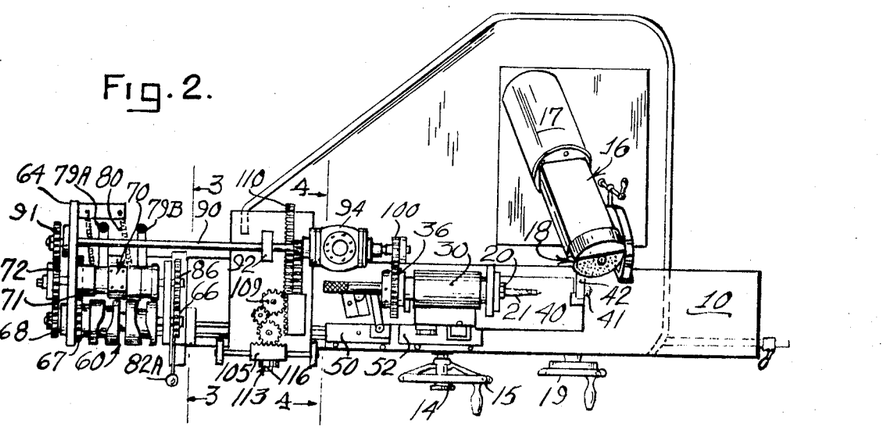
FIG. 2 is a top plan view of the machine of FIG. 1.
Figure 5:
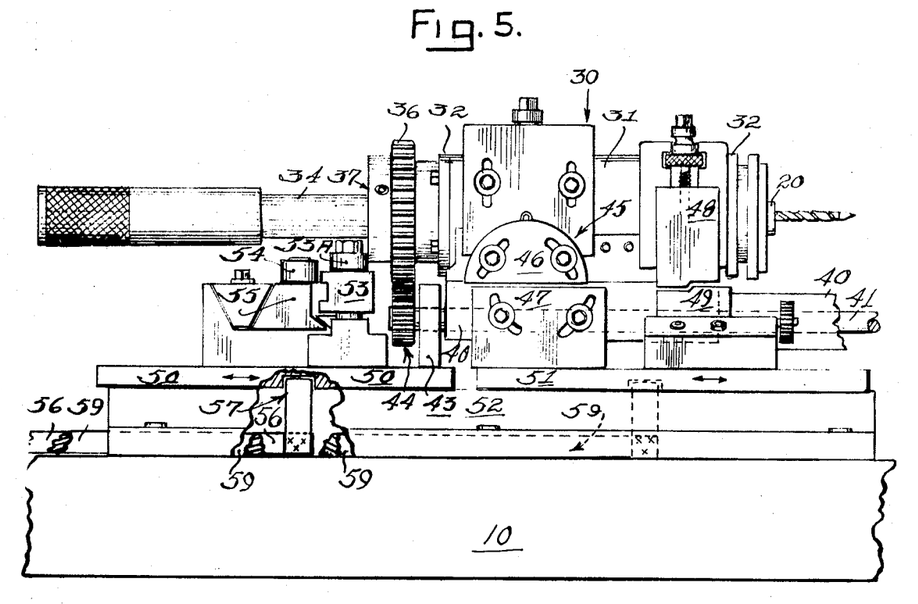
FIG. 5 is an enlarged side elevation of the headstock assembly.

The headstock 30 comprises a casting seen in FIG. 2, and to larger scale in FIG. 5, including an upper partly cylindrical body portion 31 having a large longitudinal bore closed at its opposite axial ends by end plugs 32 carrying bearing means (not seen) journalling a headstock spindle 34 fitted at the front with suitable chuck means 20. At the rearward extension of the spindle is a large spindle gear 36 fast therewith and having a cam face 37 utilized in reciprocating the spindle in a manner to be described hereafter.

As shown schematically in FIG. 9, the headstock spindle 34 is fitted internally with a compression spring 38 working between a stop collar 39 and the front closure plate 32 to urge the spindle rearwardly to a normal position.

Figure 4:
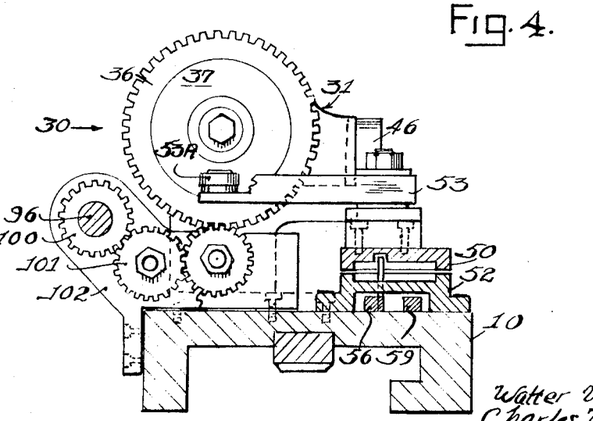
FIG. 4 is an enlarged cross-sectional detail taken along lines 4—4 of FIG. 2 with parts seen in elevation.

At the lower part of the headstock casting 30, as in FIGS. 2, 4, and 5, is a table portion 40 which is traversed by a dead rocker shaft 41 journalled at its forward end in a post 42 and at its rearward end in another post 43, this latter end also carrying a free pinion 44 meshing with the spindle gear 36 in a planetary relationship permitting the table 40 to be rocked about the common axis of the rocking shaft 41 and its pinion 44 while the pinion rotates to drive the headstock spindle 34 as an intermediate idling gear in a power train driven from a main shaft to be described.

It is to be observed at this juncture that the headstock spindle 34 can be given at least three degrees of simultaneous motion, namely: rotary, linearly-reciprocable in the headstock, and radially (i.e. arcuately) in a direction laterally of the head stock axis, such movements being utilized in various combinations and magnitudes to displace the work piece or drill 21 in relation to the grinding wheel 18 while the entire headstock assembly is travelling with the carriage.

Fitted for angular adjustment in an arcuate seat 45 in the side of the headstock casting 30, FIG. 5, is a driven cam block 46 cooperable with a reciprocable companion driving block 47 mounted for angular adjustment on a slide plate 51 bedded on the carriage and which is operative to glide against block 46 and impart a slight lateral rocking motion to the one-piece headstock table and casting responsive to reciprocatory movements of said slide as the result of longitudinal driving movements of certain corresponding long drive rod means to be described hereafter.

Additional laterally arcuate movement for secondary relief can be imparted to the headstock by a further driven cam block means 48 removably and adjustably carried on the headstock casting, FIG. 5, and similarly cooperable with a companion driving cam block means 48 removably and adjustably carried on the headstock casting, FIG. 5, and similarly cooperable with a companion driving cam block means 49 carried on the slide 51 bedded on the carriage for reciprocation by a corresponding long drive rod means to be described hereafter, such rocking secondary relief action occurring in selectively timed relation to the principal rocking relief motion provided by the first-mentioned cam block means 46, 47 to effect an added radially-arcuate movement of the work piece in relation to the grinding wheel, it being noted that the cam block 48 is vertically adjustable while the block 49 is horizontally adjustable, and a variety of coacting cam surface configurations can be provided. The two rocking radial relief motions thus imparted to the headstock assembly, and hence to the work piece, are commonly employed to effect radial and secondary relief in a way such that the arcuate contour of the grinding wheel does not grind a hollow or arc in the lips and lands of drill flutes in conjunction with concomitant rotary and linear movements of a spiral drill or the like while being rotated and linearly displaced by the headstock spindle in its travel with the carriage, the improved spindle drive means hereafter described being effective to modulate the spindle speed in a desired ratio to the carriage travel in accordance with selectable settings of a sine bar mechanism also to be described, in order that the helical flutes may be turned into juxtaposition with the grinding wheel at precisely the right moment relative to the radial displacement of the drill toward the wheel.

Means for deriving timed driving forces for simultaneously or selectively imparting reciprocatory and lateral displacements to the headstock spindle in conjunction with the aforesaid cam block components comprises, FIG. 5, the pair of tandem slide plates 50, 51 bedded on a block 52 on the carriage alongside the headstock, the first slide block carrying a rocker lever 53 equipped at its end with a roller 53A bearing against the cam face 37 on the spindle gear as the result of the action of the mentioned compression spring 38 in the headstock urging the spindle and gear back against said roller, the rearward limit of motion of the spindle being adjustable by setting a backing roller 54 along its slideway 55.

The slide plate 50 is reciprocated by a long drive rod 56 coupled therewith internally by lug and slot means 57, FIG. 5, said rod extending longitudinally rearwardly along the carriage beneath the cross rack and gear assembly, and a compound timing cam assembly generally indicated at 60, FIGS. 1, 2, and 9, and further described hereafter.

The second slide plate 51 is similarly reciprocated by another long drive rod 59 running alongside the first one rearwardly for driving coaction with said cam assembly, as will appear. Mounted on slide plate 52 are the two previously-mentioned driving cam blocks 47 and 49 in driving juxtaposition with their respective companion radial and secondary relief cam blocks 46 and 48 for the purposes aforesaid.

Figure 6:
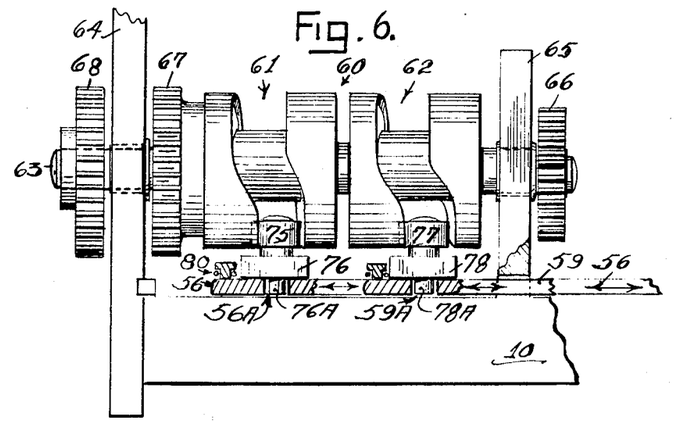
FIG. 6 is an enlarged side elevation of the headstock driving cams.

As depicted to larger scale in FIG. 6, the timing cam assembly for the headstock comprises a compound barrel or drum cam 60 having two circumferential cam tracks 61 and 62 and supported on a shaft 63 journalled at one end in a vertical back wall plate 64 on the carriage, and at the opposite end in a vertical front plate 65, this end of the shaft carrying a gear 66 for purposes to appear, and the rearward end of the shaft carrying two gears 67 and 68 situated on respectively opposite sides of the gear carriage plate.

Referring to FIG. 2 and to the schematic view of FIG. 9, another hydraulic motor 70 is mounted on the inner face of the back plate and has a driving gear 71 meshing with the rearward gear 67 of the drum cam to drive the latter, there being another drum cam gear 68 on the outer face of the wall plate meshing into further gears 72, 91, to drive the long headstock spindle power shaft 90 and related spiral drive means.

Working in the respective tracks of the compound drum cam are rollers 75 and 77, FIGS. 6 and 9, respectively journalled on the ends of corresponding rocker bars 76 and 78 pivoted at their opposite ends on posts 79A, 79B, affixed to a bracket travelling with the carriage, these bars being free to swing in an approximately horizontal plane as their respective cam rollers follow in the corresponding cam tracks. Springs 80 and 84 (FIG. 3) for each rocker arm urge the outer ends thereof to dispose the rollers upwardly into their corresponding cam tracks.

As shown in FIG. 6 and 6–A, the rearward ends of the two long cam-block drive rods 56, 59, are provided with respective coupling notches 56A, 59A, each drivingly engageable and disengageable, by lateral shifting of the rods, with a corresponding coupling formation 76A or 78A at the ends of the corresponding cam follower rocker arms when said rods are in the appropriate laterally-shifted conditions for the purpose.

Means for causing the two drive rods to engage and disengage their respective cam follower rocker arms comprises a control slide 82 working in a long groove in a bed block 83 fixed on the (FIG. 3) carriage to shift crosswise of the drive rods close to the front of the drum cam, there being slots 81 in this slide into each of which one of the drive rods fits slidably such that when the slide is moved, as by a handle 82A (or by power, as will appear), against the normalizing action of a spring 84, the two rods are forced sidewise outwardly to disengage their respective coupling slots from their cam rocker arms, so that no longitudinal movement will be imparted to either rod; but when this control slide is disposed in normal position by spring 84 the two rods are operatively engaged with their cam rocker arms and will be reciprocated in accordance with the rotary displacement of the corresponding respective drum cam tracks, in consequence of which the two headstock slide plates 50, 51, will likewise be reciprocated for the dual purposes of reciprocating the headstock spindle longitudinally in situ, and concurrently reciprocating the two radial-relief and secondary-relief driving cam blocks to rock the headstock as previously explained.

Figure 3:
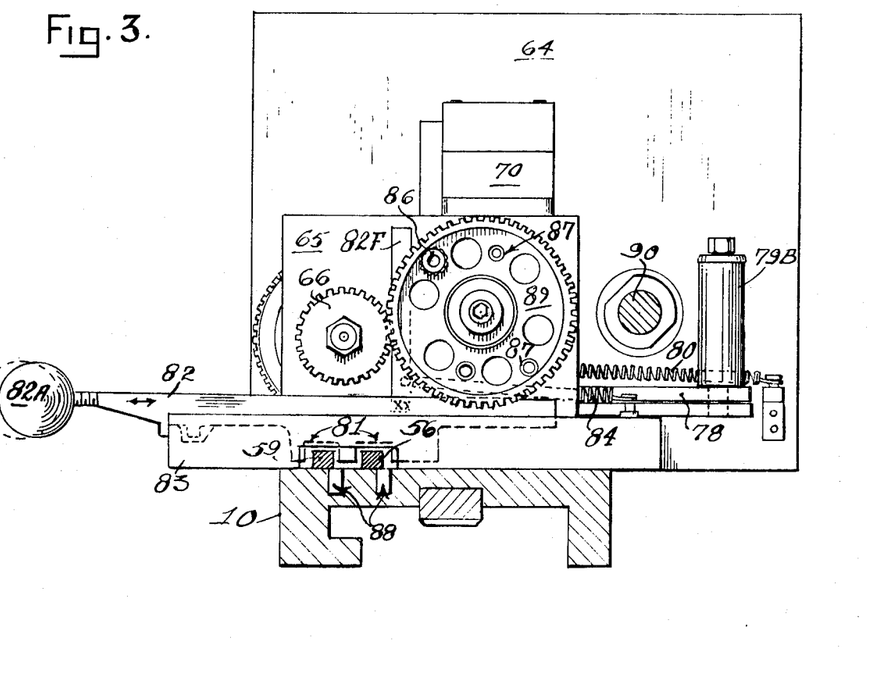
FIG. 3 is an enlarged cross-sectional detail taken along lines 3—3 of FIG. 2 with parts shown in elevation.

The aforesaid driving movements of the two long drive rods can be made to occur in variously timed patterns by automatically controlled reciprocations of the coupling control slide 82 effected through the medium of the projecting end of a timing pin 86, FIG. 3, which may be selectively inserted in any of a plurality of radially and relatively angularly offset socket holes 87 provided in the face of a timer gear 89 idling on the front vertical wall plate 65, and driven from the front barrel cam gear 66. As the timer pin rotates with gear 89, the projecting end thereof strikes an upwardly projecting finger 82F on the slide thereby moving the slide against the tension of its normalizing spring 84 so as to momentarily uncouple the drive rods from their respective cam follower rollers until the timing pin has turned past said finger and the control slide is spring-returned to normal position to recouple the rods. Several of the timer control pins may be disposed on the timing gear at different relative angular spacings to determine the frequency and duration of the decoupling actions per cycle for various grinding operations. Moreover, either rod may be disabled by placement (FIG. 9) of a blocking pin 86X in a socket hole 88 alongside of each rod to block the rod from returning to driving engagement with its cam rocker.

A highly important aspect of the improvements relates to the means for modulating the normal speed of rotation of the headstock spindle by adding or subtracting torque thereto in selective ratio to the advance of the machine carriage 10, and thereby accelerating or retarding the speed of the headstock spindle end and the work chucked therein.

Figures 7, 8:
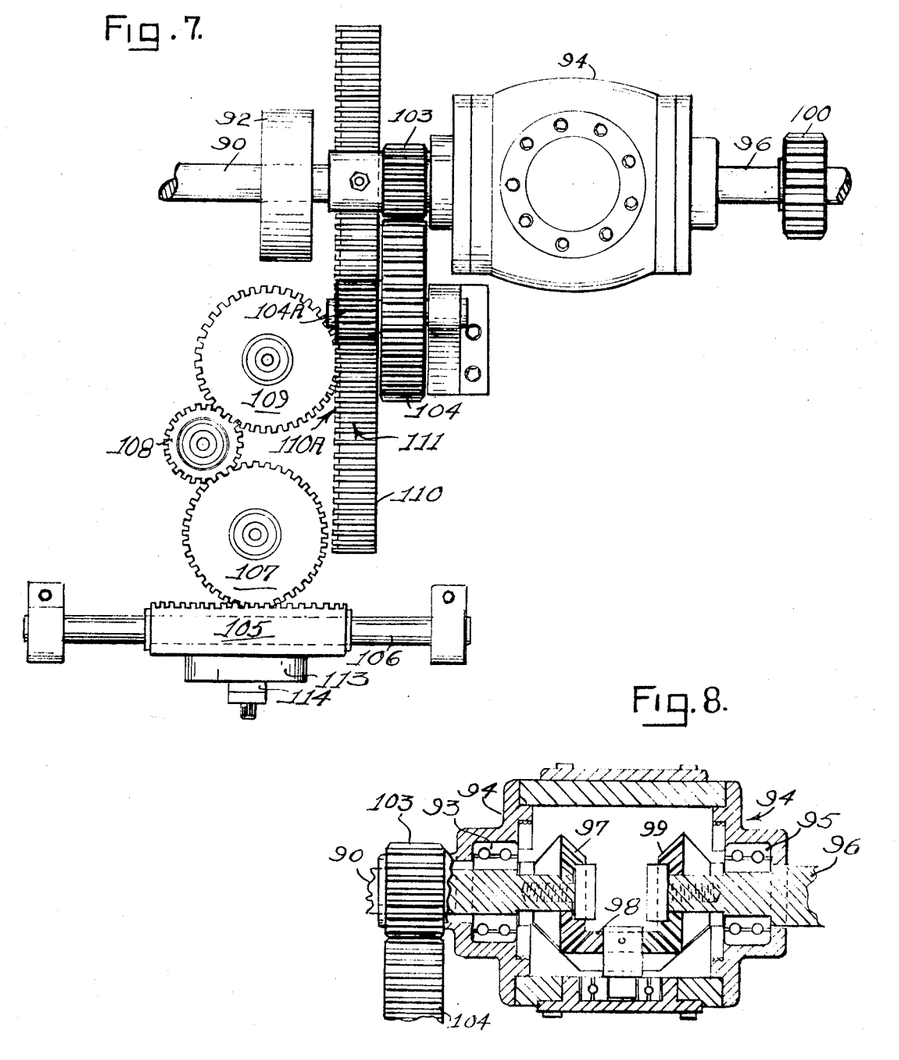
FIG. 7 is an enlarged plan layout of parts of the differential sine drive means.
FIG. 8 is an enlarged sectional detail of one form of differential drive unit.

The headstock spindle 34 rotates at a predetermined normal constant speed by power taken from the forward or right-hand end of the long power drive shaft 90 (FIG. 2), the rearward end of which, with its motor-driven input gear 91, is supported, as previously seen, at the rear vertical carriage end plate 64, the shaft extending forward through a pillow block 92 on the carriage and thence into engagement with a first bearing means 93, FIGS. 7 and 8, supporting one end of a differential housing or shell 94 having an opposite end supported by a second bearing means 95 fixed on an output stub shaft 96.

Fixed on the end of the motor shaft within the differential housing is an input bevel gear 97 meshing with an intermediate bevel gear 98 journalled on the housing wall and which drives an output bevel gear 99 fixed on said output stub shaft. So long as no restraint or loading is applied to the differential housing, rotation of the motor shaft will impart rotation to the output stub shaft and its output drive gear 100 at the selected speed of the driving motor, so that the headstock spindle, driven from gear 100 through intermediate gear 101 on an outboard carriage bracket 102 (FIG. 4) will normally rotate at a proportionately constant speed.

Modulation of the otherwise constant selected speed of the headstock spindle is achieved by ratio interdrive means coacting with the carriage and the differential gear means, and may comprise a sine bar translating mechanism depicted particularly in FIGS. 1, 2, and 7, wherein a sine rack 105 is mounted to reciprocate in the direction of movement of the carriage on a slideway 106 affixed to the side of said carriage, the movement of this rack being transmitted through a set of transfer gears 107, 108, and 109, into a first set of rack teeth 110A on the side of a compound cross rack 110 having a second set of rack teeth 111 on its upper face meshing with the pinion 104A of a cluster gear 104 which drives a collar gear 103 fast on the differential housing 94 at the input side, such that when the cross rack is forcibly shifted one way or the other, it applies a positive or negative torque correspondingly to the differential housing so that there will be a consequent speeding-up or slowing down of the output stub spindle 96 and its gear 100 and therefore of the headstock spindle, depending upon which direction the cross rack moves in respect to the direction of rotation of the power shaft 90, on the one hand, or the carriage 10 on the other.

The ratio of the amplitude of displacement of the sine rack 105 relative to the travel of the carriage is determined by the setting of a sine bar 113, FIG. 1, carried on an adjustable pivot clamp block 114 affixed to the side of the carriage. The sine bar has a long slot 115 into an upper end portion of which a coupling roller 116 projects from the sine rack so that as the sine bar swings, the rack tends to move codirectionally with the carriage movement but at a relative rate determined (for any given setting of the pivot block 114) by an adjustable stop 117 movable for setting to any position along the lower length of the slot 115 of the sine bar, said stop abutting a vertical limit bar 120 which is positionable along a horizontal line responsive to turning know 121 and causes the sine bar to swing on pivot means 114, so that the upper end thereof shifts the sine rack proportionately.

Since the sine rack and its set of transfer gears all move with the carriage, only a relative motion of the upper end of the sine bar shifting the sine rack itself can move the cross rack to cause an application of supplemental turning effort to the differential housing and hence to the work spindle. This added torque will be of accelerating (or decelerating) character because the motion of the sine bar varies as the sine of the angle it makes with the vertical reference line as the carriage advances, and the slope of the sine wave is quite rapid during the initial movement of the sine bar until it begins to approach about 45°, as a result of which the speed of rotation of the work spindle will be proportionately increased to assure that the proper area along the flute helix will be turned into juxtaposition with the grinding wheel as the headstock moves the drill laterally into contact therewith.

It will be understood that forms of sine drive, other than the side-swinging bar type 113 illustrated, may be employed to actuate the differential modulating means, another suitable form, consisting in a block (not illustrated) affixed to the side of the carriage to lie in a horizontal plane for angular adjustment about a pivot to dispose an elongated trackway or raceway at a selected angle to the direction of travel of the carriage so that a stylus or follower guided by a roller working in the raceway is moved at a rate proportioned to the angular pitch thereof, such stylus or follower being, in this instance, connected to the sine rack 105 to modulate the differential drive means.

The speed modulating differential means described in view of FIGS. 7 and 8 is advantageous in that it can be held to relatively small size so long as the input-output ratio is about 1:1; however, this ratio permits grinding spiral flutes only down to a diameter of about three-sixteenths inch unless changes are made in the cross rack drive means. By providing a differential headstock drive having a high input-output ratio, the work spindle can be accelerated to permit grinding spiral flutes for any size of drill greater or less than three-sixteenths inch while using the same length of cross rack 110 and associated translating gear system.

FIG. 9 illustrates the construction of a compound differential unit providing an output ratio of about 4:1 and capable of modulating the headstock spindle for grinding any diameter up or down from three-sixteenths inch, to include very fast spiral leads, said accelerating unit comprising a housing structure 122 in which are journalled dual planetary gear sets each having a shaft 123, 123A, working in bearings 124 seated in the axial end wall plates of the housing and each having affixed thereon a driving or input gear 97X, while two larger-diameter ratio gears 127, 127A of each set mesh with an output gear 100X on a stub shaft 96X, the latter having a coaxial spindle stud 96Y running free for bearing support in a bore 90Y formed coaxially within the end of the motor drive shaft 90X.

As in the case of the differential drive means of FIGS. 7 and 8, the housing shell 122 has an input collar gear 91X fast therewith and adapted to mesh with the modulating cross rack 110 so that the unit can be substituted for the 1:1 unit 94 with suitable allowances for the larger overall size of the compound high-ratio differential.

In accordance with a modification of the apparatus illustrated in FIGS. 11 through 18 the headstock assembly is embodied for general use as a relieving and backing-off fixture adapted for bedding on any machine carriage 10W to be driven by essentially the same modulating drive means previously described and likewise embodied in the form of a fixture.

As seen in FIGS. 11 and 12, the headstock itself comprises a block-shaped body or head 130 mounted along one side of a primary or upper table plate 140 and supporting in suitable front and rear bearing means (not seen) a work spindle 132 equipped at its forward end with chuck means 133 and at its rearward end with a removable primary or driven spindle gear 134 and a similarly removable secondary or cam-driving gear 135, the same comprising a cluster gear, if desired.

Fixed along one side of the head block 130 is an upright bracket plate 136 supporting an electric motor 137 having built-in reduction gearing and an output spindle carrying a power drive gear 137A imparting rotation to the work spindle through gear belt means 139 driving the aforesaid primary or spindle gear 134, said motor, like the hydraulic motor of the machine tool embodiment of FIG. 1, being capable of substantially constant working speed at adjustable rate under control of suitable auxiliary speed control means of known character and therefore not shown.

The upper table plate 140, carrying the aforesaid headstock components and motor drive means, is slidably mounted upon a secondary or lower table or carrier plate 141 by precision bearing means 144 of a known type, further alluded to hereafter, in such manner that the upper or primary table can shift laterally or crosswise of the lower or secondary table plate, the latter in turn being slidably mounted by further precision bearing means 145 to shift longitudinally upon a base plate 142.

As viewed in FIG. 14 a long rocker arm 150 is pivotally mounted at one end by pin means 151 seating in a small yoke block 152 fixed on the top of the headstock body, said rocker arm extending across the table and its opposite end having a fork slot 153 slidably engaging a roller 154 secured between trunnion arms 155 at the top of a vertically slidable shuttle member 160.

Means for oscillating the rocker arm comprises a cam-follower roller 156 carried between the ends thereof and driving with a large rocker cam 157 having a stub shaft journalled in a pillow block or post 158 on the table plate and fitted with a driven gear 159 rotated by gear belt means 135A and the headstock spindle gear 135. Thus, the cam rocker means 150, 157 will reciprocate the shuttle slide 160 in timed coaction work rotation of the work spindle 132 for purposes to appear.

Owing to the coordinate mobility of the two headstock table plates and associated drive means, the entire headstock assembly is capable of simultaneous displacement in two directions, while the spindle is rotating, one being parallel to the axis of rotation of the spindle and the other laterally or radially thereof, as in the case of the headstock means of FIG. 2, with similar independence of all motion components in respect to magnitude, direction and timing.

Means for yieldingly disposing both of the slide or table plates 140, 141, in a home or normal position comprises, FIGS. 11 and 12, a single tractile spring 146 anchored on a base post 147 and connecting with the top plate, as at 158, to act on the latter and also on the lower or secondary plate along a line making an angle of approximately 45° with both plates in a manner such that they are resultantly urged to said normal positions, the top plate toward the shuttle assembly and the secondary plate toward the left.

The shuttle 160, FIG. 11, comprises an upstanding stationary carrier plate 162 affixed as at 163 to the base plate 142 and having secured thereon, FIG. 16, a set of elongated roller-bearing ways or bars 164 respectively juxtaposed with aligned way bars 165 secured in the shuttle channel. Cylindrical rollers 166, FIG. 17, are captured in corresponding elongated retaining plates or cages with their respective axes pitched in alternation such that the end portions of each roller are free to roll in the confronting V-shaped grooves or tracks 168 in each confronting pair of said way bars, this known type of bearing being preferred although other forms of precision bearing support may be employed to mount the shuttle for vertical reciprocation on the carrier plate 162.

Means for imparting simultaneous or compound radial and axially lengthwise displacements to the headstock assembly, as aforesaid, includes (FIG. 15) a pair of angularly offset, rotatively adjustable cam elements 170, 175, respectively pivotally affixed with their axes at right angles to each other on the side and front face of the shuttle plate 160, cam 170 (FIG. 18) engaging a wide cam roller 172 carried on a bracket 173 secured on the upper table and slide plate 140 in juxtaposition therewith to maintain driving contact throughout the vertical travel of the shuttle in a manner to impart (cooperatively with the angularly-acting spring means 146) reciprocatory cross motion of said slide, while the companion cam 175 driving with another roller 176 similarly journalled on a bracket 177 at the opposite side of the shuttle, will simultaneously impart longitudinal sliding reciprocation to the secondary slide plate 141, owing to the cross-wise disposition of the roller bearings 144 (FIG. 14).

The two slide-driving cam elements 170, 175, are rotatively adjustable on loosening of their respective set screws 170A and 175A, and these cams will preferably be provided with angular scalar markings to facilitate such adjustment to determine the magnitude of the radial and axial displacements of the drill or other workpiece set in the headstock chuck in relation to a grinding head and wheel of the type illustrated at 16, 18 in FIG. 1. By changing the gear means 134, 135 on the headstock spindle, the rate of the shuttle movements can be regulated relative to the rotation of the work spindle to produce requisitely timed motion for performing radial relief, backing-off and like operations on a tool having any number of flutes.

The motor 137 is preferably a precision type and adjustable in speed by control means of known character and therefore not illustrated. When it is desired to use the fixture with another source of driving power, such as the differential modulating drive means, the motor 137 is readily disconnected from the headstock spindle by removal of the gear belt 139, this condition being shown in FIG. 11.

The differential drive fixture as seen in FIGS. 11 comprises a bed plate 180 to which is affixed an upright motor-supporting plate 181 having a precision type speed-reduction motor 182 removably attached to a bracket at the upper end thereof. Spaced from the upright motor plate on the bed is a smaller upright bearing plate 183 equipped with bearing means 185 aligned with bearing means 184 on the motor plate to support a differential drive unit 94W which may be identical to either the unit 94 of FIG. 8, or the fast angular-lead unit 94X of FIG. 9.

The input drive 94W of the differential unit extends through the bearing means 184 beyond the motor plate into engagement with a driven gear 186 fast thereon and connected by gear belt means 187 with the motor gear 188, while the differential output spindle 96W extends beyond the bearing means 185 on the smaller plate for connection with any desired driven apparatus including particularly the previously-described relieving fixture, for which purposes a universal coupling is provided due to the non-planetary movement of the cross slide 140 in radial displacement of the headstock.

Preferably a quick-disconnect type of universal drive coupling will be used where the described fixtures are frequently joined and disjoined, one such coupling means comprising, as shown in FIGS. 11 and 12, a conventional joint 189 of the swivel type at one end of the coupling shaft 190, the opposite end of which is equipped with a ball-type joint consisting of a spherical socket 191 with slots 192 receiving a ball head 193 having radial pins 194 and affixed to the end of a short stub shaft 195 having a splined collet nut coupling 196 engaging the end of the headstock spindle extending beyond the cluster gear thereon, such that the stub shaft may be quickly engaged and disengaged therefrom by manipulation of the nut 196 while the driven headstock spindle can shift axially or radially owing to the pin slots 192.

Modulation of the speed of rotation of the headstock spindle is effected in the differential fixture by means of a cross rack structure 110W, FIG. 12, which is preferably supported on the bed plate 180 for reciprocable motion by slide means of the type employed for the shuttle and comprising a channel-shaped base plate 200 fixed on the bed plate and having a complementary channel-shaped slide member 201 supported thereon by precision roller bearing means 202 substantially identical to, but smaller than, that described for said shuttle and similarly housed within the confines defined by the confronting channel configurations.

The cross rack 110W is fixed on the slide to reciprocate crosswise of the differential shaft in driving engagement with a first intermediate gear 204 journalled on the motor plate and driving with the differential housing collar gear 103W.

The cross slide has affixed to the side thereof a side rack 111W driven from a set of translating gears 107W, 108W, 109W on the bed plate with gear 109W, regarded as an input gear, positioned to mesh with a longitudinally sliding sine rack 105W on the machine carriage 10W, the bed plate and location thereon of said input gear 109W being such that such meshing is effected by placing the bed plate 180 in juxtaposition with said sine rack with the aid of a locator notching 206 on the edge of the bed plate fitting with the sine rack posts 106A.

The sine rack 105W is cooperable with a sine bar structure 113W which can be identical in construction and operation to that described in view of FIGS. 1 and 2 and functions to shift the sine rack 105W in like manner and transmit such motion at the selected ratio through the intermediate translating gear set 107W, 108W, 109W, into the modified cross rack structure 111W, 110W, for injection of modulating torque into the otherwise normal drive afforded by the motor-powered input shaft 90W in a manner and for purposes essentially the same as for the machine embodiment first described.

We claim:

1. In a machine for spiral, radial-relief, and like grinding operations, the combination with a travelling machine carriage of:

a headstock structure including a work spindle; a driving motor and power shaft for rotating said work spindle at selected normal speeds; means driven by said motor operative to effect reciprocation of said work spindle laterally of, and also in the direction of its axis of rotation concurrently with rotation thereof by said power shaft; modulating drive means for the work spindle adapted to be variably driven as a function of travel of said carriage and including differential drive means comprising a planetary gear system in series driving relation with said power shaft and an output spindle having driving connection with said work spindle, said planetary gear system having an input gear, an output gear driving said output spindle, and a differential input gear all rotatable in coaxial alignment with the axis of said power shaft; together with adjustable-ratio sine drive means cooperable with said planetary gear system for changing the normal speed of the work spindle as a function of carriage travel as aforesaid and including a first gear rack driving said differential input gear, a second gear rack adapted to be driven from carriage movement, translating gear means drivingly interconnecting said racks, and an adjustable sine drive member moved by the carriage and driving said second gear rack.

2. Apparatus according to claim 1 wherein said differential drive means includes coacting gear means affording a driving ratio between said differential input gear and said output spindle which is approximately 1:1.

3. A combination according to claim 1 wherein said work spindle is supported by the headstock structure carried on table means movable laterally of the spindle axis, and said driving motor actuates cam means operative to transmit driving effort to said table means to effect lateral displacement thereof and the work spindle relative to its rotation axis at a timed rate relative to the speed of rotation thereof.

4. The combination of claim 3 further characterized in that said cam means coacts with further means driven thereby and carried by said table means operative to effect an axially-directed reciprocation of the work spindle relative to the carriage in its direction of travel.

5. Apparatus according to claim 1 further characterized in that said motor shaft extends alongside the carriage codirectionally with the travel thereof, said first gear rack is mounted on the carriage to reciprocate laterally of said shaft, said second gear rack is carried by the carriage adjacent a side thereof remote from said shaft to reciprocate codirectionally with the travel thereof, said translating gear means consists of a train of gears on the carriage spanning the distance thereacross between said gear racks to drivingly interconnect the same as aforesaid; and said sine drive member comprises a sine bar oscillable by carriage travel in adjustable magnitude in a plane parallel to the direction of movement of the second rack in juxtaposition with the latter and drivingly interconnecting therewith to move the same responsive to carriage movement at a ratio determined by the magnitude of angular movement for which said member is adjusted.

6. Apparatus according to claim 4 wherein said cam means comprises a barrel cam situated adjacent and driven by said driving motor on said carriage and having two circumferential cam tracks with respective cam follower means driving therewith, a long drive rod reciprocated by each cam follower, said rods extending to and being respectively drivingly interconnected with further cam means respectively and adjustably operative to reciprocate the table means laterally as aforesaid.

7. Apparatus according to claim 6 further characterized in that said drive rods are each connectable with and disconnectable from their respective cam followers by lateral movement of the rods, and manually operable means is provided on the carriage operative to shift said rods to and from operative connection with corresponding cam followers.

8. Apparatus according to claim 7 further characterized in that said rods are normally yieldingly urged into operative connection with their respective cam followers, and there is further provided pin means removably insertable in predetermined positions along side each rod to dispose the appertaining rod in disconnected relation with its cam follower.

9. Apparatus according to claim 7 further characterized in that said rods are normally yieldingly urged into operative connection with their respective cam followers, and there is further provided control means for automatically momentarily disconnecting said rods from the cam followers at a time rate, said control means including a rotated member driven with said cam adjacent said rods and said manually operable means and including a removable pin member rotatable with the rotated member to transiently engage and actuate the manually-operable means intermittently in time with rotation of said cam.

10. In a grinding machine, the combination, with a travelling machine carriage, of: a headstock structure movable with the carriage and including a rotatable work spindle and means disposing the same to permit additional displacements thereof laterally and also longitudinally of the direction of its axis of rotation simultaneously with rotation thereof about said axis; cam means operative to effect said additional displacements; drive means comprising a motor adjustable to provide desired normal work spindle speeds and a power shaft rotated by said motor; speed-modulating means comprising a planetary gear unit including a housing, an input gear driven by said power shaft coaxially of the shaft axis, an output gear and spindle rotatable coaxially of the said shaft axis; a differential modulating gear affixed to the housing to rotate the same coaxially of said shaft axis, and planet gear means in the housing drivingly interconnecting said input and output gears and housing in a manner such that torque applied to the differential modulating gear imparts corresponding torque to the normal speed of the output spindle; means drivingly interconnecting said output spindle with said work spindle; means including a differential gear rack adapted to travel with said carriage and operative to drive said differential modulating gear; and adjustable-ratio sine drive means actuated by the carriage in travel thereof operative to drive said differential rack to apply modulating torque to the differential modulating gear and modify the normal speed of the work spindle accordingly.

11. In a grinding machine for radially relieving and backing off spiral drills and form tools by use of a work spindle with means effecting timed reciprocation thereof axially and radially on a linearly travelled carriage, improved mechanism for actuating the work spindle characterized by the combination with a power drive shaft on said carriage of planetary differential means in tandem therewith for transmission of normal and modulated driving torque to the work spindle and comprising a differential input gear and differential output gear and output spindle journalled in a differential carrier all rotatable about a common differential axis concentrically aligned with the power shaft axis, said carrier having a modulating gear affixed thereto and rotative about said common axis together with further differential gear means drivingly intercoupling said input and output gears; means mounting the work spindle to rock about an offset axis substantially parallel to said common axis; gear means operative to rotate the work spindle in all radially displaced positions thereof; means driven in timed relation to the speed of said power shaft for selectively effecting axial reciprocation and radial oscillation of the work spindle; together with translating gear means operative to convert motion of the carriage to a modulating force which is a predetermined selected angular function of carriage travel and apply such force to the modulating gear to modify the work spindle speed accordingly; and means driven in timed relation to the work spindle speed for selectively effecting axial reciprocation and radial oscillation of the work spindle as aforesaid.

12. Grinding apparatus as defined in claim 1 further characterized in that said headstock structure and differential drive means are fixed in cooperative relationship with said carriage as structural components thereof.

* * * * *